Patented May 7, 1946

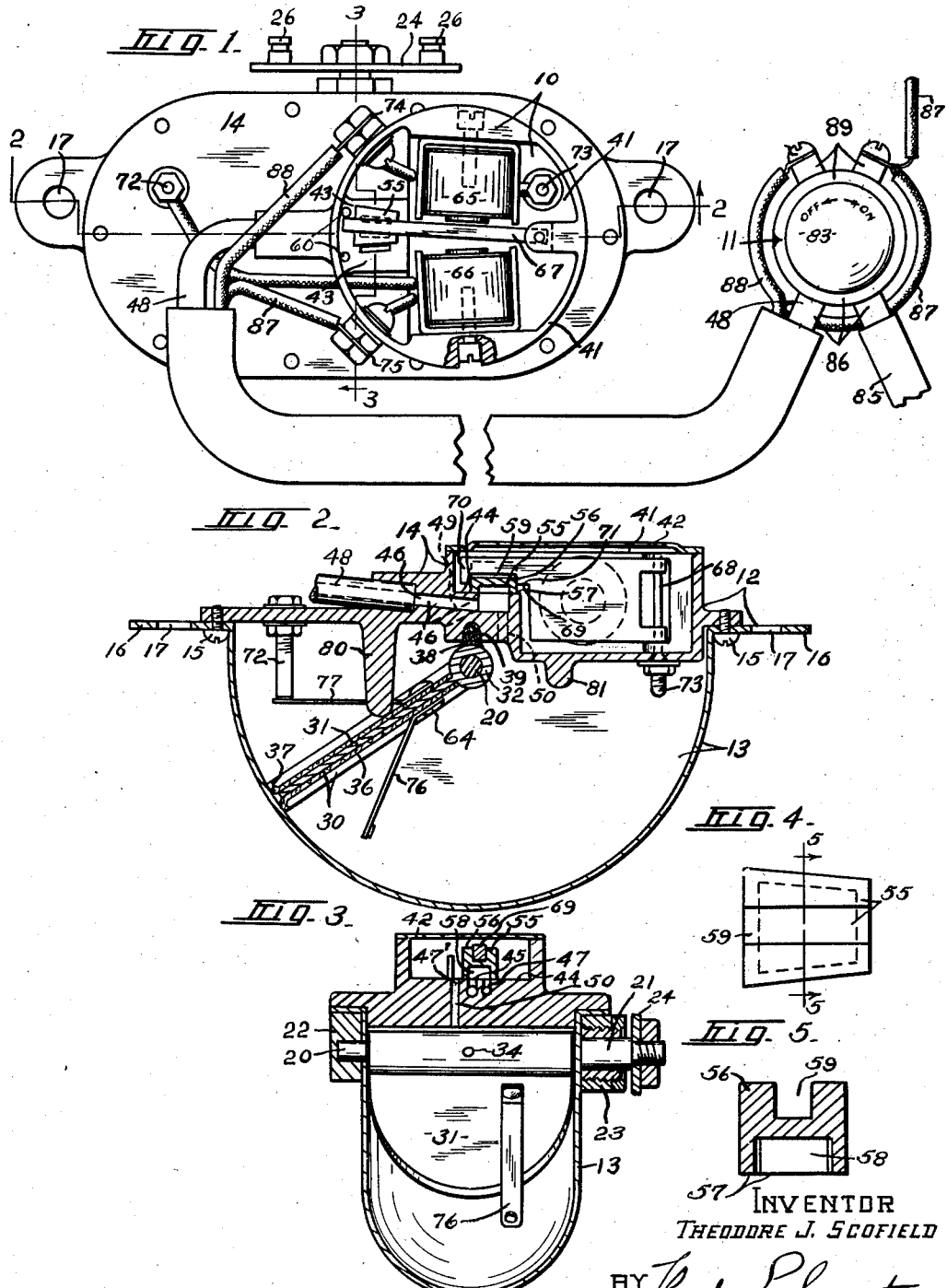

2,399,833

UNITED STATES PATENT OFFICE 2,399,833

WINDSHIELD WIPER MOTOR

Theodore J. Scofield, Jackson, Mich.

Application July 5, 1941, Serial No. 401,143

9 Claims. (Cl. 121—97)

This invention relates to improvements in power driven windshield cleaners for motor vehicles and pertains more particularly to an improved motor of fluid pressure actuated type. which is adapted to drive one or more wiper blades.

The objects of my invention include providing a motor which is compact, economical and durable in construction, and which is simple, strong and positive in action.

A more specific object of my invention is to provide a novel valve actuating mechanism for effecting the reversal of a fluid pressure driven motor. In carrying out this object I have provided an electrically actuated valve to control the application of fluid pressure to opposite sides of the swinging vane or piston of the motor.

Another object of my invention is to provide means for moving the piston of the motor beyond the normal operating limit at one end of its travel in order to move the wiper blades beyond the normal wiping zone into a position at one side of or below the normal wiping zone when the motor is stopped.

I achieve these objects by the mechanism described in the following specification and illustrated in the accompanying drawing in which:

Figure 1 is a plan view of a windshield cleaner motor and control unit therefor, embodying the various features of my invention, and wherein the cover of the motor valve chamber is removed to expose the valve and valve operating mechanism to view, with a portion of the connections between the control unit and motor being broken away.

Figure 2 is a longitudinal sectional view taken through the motor on substantially the line 2—2 of Figure 1.

Figure 3 is a transverse sectional view taken substantially on the line 3—3 of Figure 1.

Figure 4 is a plan view of the slide valve.

Figure 5 is a section taken on the line 5—5 of Figure 4.

Referring now to the drawing, the motor 10 is here illustrated as of the swinging vane type adapted to be driven by the differential pressure between the intake manifold of the motor vehicle engine and the atmosphere. A suitable control member 11 is provided for starting and stopping the motor 10 and is connected thereto by a suitable conduit and wiring presently to be described.

The motor 10 comprises a casing 12 having an arcuate piston chamber 13 and cover 14 secured to chamber 13 by means of suitable fastenings, for example screws 15. Mounting lugs 16 are provided with apertures 17 in order that the motor may be secured to the vehicle. A rotatable shaft 20 extends transversely through the chamber 13 and projects outwardly therefrom at one side thereof as shown at 21. Shaft 20 is located substantially at the center of curvature of the chamber 13 and is provided with suitable bearings 22 and 23 attached to or formed integrally with said chamber. The motor shown in the drawing is adapted to drive two wiper blades simultaneously by means of the double crank or yoke 24 which is suitably fastened to the projecting portion 21 of the shaft 20. Yoke 24 is provided with two crank pins 26—26 secured to the yoke at substantially equal distances on either side of the shaft 20.

The shaft 20 is actuated with a reversely rotary movement by means of piston or swinging vane 30, which comprises a substantially flat metal blade 31 shaped to fit the transverse cross-sectional contour of the chamber 13. The flat side of the blade 31 is fastened to a sleeve 32 which is adapted to receive the shaft 20 therein. The sleeve 32 may be fastened to the shaft 20 by one or more pins 34. In order to prevent leakage from one side of the vane 30 to the other, flexible packings 36 composed of leather or other suitable material are fastened to each side of the blade 31. The packings are formed with cupped marginal portions 37 which under the action of fluid pressure make intimate contact with the walls of the chamber 13, thus providing an effective seal between the walls of chamber 13 and the swinging vane 30. In order to prevent leakage between the cover 14 and the sleeve 32 a packing member 38, of suitable material, such as leather, is placed in the groove 39 provided in the cover 14 adjacent to the shaft 20. The packing 38 is arranged to maintain intimate contact with the sleeve 32 as indicated in Figure 2.

The motor 10 is provided with a valve chest 41, which in the preferred form is formed integrally with the cover 14. A cover plate 42 is provided for closing the valve chest, although communication between the interior of the chest 14 and the atmosphere is maintained to allow the flow of air under atmospheric pressure into the valve chest 41. A portion of the floor of the valve chest 41 is raised to provide a valve seat 44. A suction port 45 is provided in the valve seat and is connected by a suction passage 46 to the main suction conduit 48. Located symmetrically at either side of the suction port 45 are chamber ports 47 and 47'. Chamber port 47 is connected to the interior of piston chamber 13 at the left hand side of vane 30 (see Figure 2) by means of passage 49. Chamber port 47' is connected to the interior of the piston chamber 13 at the right hand side of vane 30 (see Figures 2 and 3) by means of passage 50.

A slide valve 55, adapted to slide on the seat 44 comprises a valve body 56, having a face 57 into which a recess 58 is formed. As the valve 55 is slid from one side of its center position to the other, it alternately uncovers one of the chamber ports, while connecting the other chamber port to the suction port 45 through the recess 58. The upper surface or back of the valve body 56 is provided with groove 59 for a purpose presently to be described. Stop pins 60 are provided to limit the movement of valve 55.

The valve actuating mechanism will now be described. Mounted within the valve chest 41 is a pair of electro-magnets 65 and 66. The electro-magnets 65 and 66 are placed opposite one another and an armature 67, common to both electro-magnets, is pivotally mounted on pin 68 to swing between the magnets. A valve rod 69 formed as an extension of the free end of the armature 67 engages the groove 59 in the slide valve 55. The rod 69 is provided with downwardly projecting portions 70 and 71 at either side of the valve 55 to properly position the valve 55 to pass over the ports 45, 47 and 47'.

Electric contacts 72 and 73 are mounted in the cover 14 at either side of the vane 30 and project into the chamber 13 as shown in Figure 2. The contacts 72 and 73 are electrically insulated from the cover by suitable means such as rubber or fibre washers and bushings. The contact 72 is electrically connected to one end of the coil of the electro-magnet 66 while the contact 73 is electrically connected to the coil of the electro-magnet 65. The other ends of the coils of the electro-magnets 65 and 66 are connected respectively to the terminals 74 and 75 which project outwardly from the valve chest to provide exterior means for connecting the valve actuating magnets with a source of electric energy. The terminals 74 and 75 are insulated from the valve chest by suitable means.

Mounted on either side of the vane 30 are the spring contact arms 76 and 77, which are positioned to make electrical contact with the contacts 73 and 72 respectively as the vane 30 swings back and forth. The arms 76 and 77 are grounded through the metal plate 31 and the shaft 20 to the case 12.

Projecting inwardly from the under side of cover 14 is a lug 80 positioned in the path of vane 30 to limit the path of swing of said vane as it moves to the left as seen in Figure 2. A somewhat similar lug 81 is provided to limit the path of swing of the vane 30 as it moves to the right as seen in Figure 2. It is to be noted that the lug 81 is shorter than the lug 80 and thus allows a further displacement of the vane 30 to the right than to the left.

The motor 10 is intended to be operated by air pressure applied alternately first to one side of the vane and then to the other. The application of pressure is governed by the slide valve which is electrically operated.

To accomplish this purpose, the motor is mounted on a convenient part of the automobile or vehicle frame and electrically grounded thereto. A suitable conduit 85 leading from the intake manifold of an internal combustion engine (not shown), may be connected through a stop valve 86 to the suction conduit 48. An electric battery (not shown) has one terminal grounded to the frame of the automobile or motor vehicle. A wire 87 connects the other terminal of the battery to the terminal 75 of the motor 10. The terminal 74 is connected through a suitable wire 88 and electric switch 89 to the wire 87. It is of course understood that the motor casing 12 may be connected directly to the terminal of the battery which would be grounded in ordinary practice. The valve 86 and the switch 89 may be combined in a single control unit 11 as shown, operated by the same control knob 83.

The operation of the motor is as follows. The valve 86 is opened to connect the suction port 45 to the intake manifold of the engine. The switch 89 is then turned on to complete the electric circuit through the terminal 74, electro-magnet 65, contact 73, and contact arm 76 to ground. The electro-magnet 65 is energized and causes the armature 67 to slide the valve 55 upwards as seen in Figure 1. The valve 55 uncovers the port 47' thus connecting the right hand portion of the chamber 13 to the atmosphere. At the same time, the suction port 45 is connected to the port 47, thus reducing the pressure in the left hand side of the chamber 13 to the pressure in the engine manifold, which is below atmospheric pressure. The difference in pressure thus created causes the vane 30 to swing to the left and actuate the windshield wipers. As the vane 30 moves toward the left, the control arm 76 breaks its contact with the contact 73, thus de-energizing electro-magnet 65. As the vane 30 approaches the left hand limit of its swing, the contact arm 77 completes the electric circuit through the electro-magnet 66, which in turn causes the armature 67 to move the valve 55 so as to uncover the port 47 and connect the port 47' to the suction port 45. The differential pressure on the vane 30 is thus reversed and the vane is caused to swing back to the right. The action is repeated as long as the switch 89 is closed and the valve 86 is open. Normally the limits of swing of the vane 30 are determined by the reversal of the valve mechanism, which in turn is governed by the contact arms 76 and 77 making and breaking the electric circuits through the electro-magnets.

To shut off the motor, the switch 89 is first opened. If it happens that the vane 30 is swinging toward the left at this time, the valve 55 will be reversed once more, because the terminal 75 is permanently connected to the source of electric energy. However, when the vane 30 swings to the right, the valve mechanism will not reverse because the circuit through the terminal 74 and the switch 89 has been broken. The continued application of differential pressure to the vane 30 will cause the vane 30 to move beyond its normal point of reversal and come to rest against the lug 81. This moves the wiper blades beyond their normal cleaning zone and into a parking position. The valve 86 is then closed and the motor remains at rest.

Although I have described and illustrated a specific embodiment of my invention, it is understood that changes in form and dimensions will occur to those skilled in the art; for example, the slide valve 55 can be replaced with a piston valve or the swinging vane can be replaced with a reciprocating piston without departing from the spirit of my invention. I therefore wish to be limited only by the scope of the appended claims.

I claim:

1. In a windshield cleaner motor having a casing and a piston relatively movable back and forth under differential fluid pressure and a reversing valve for controlling the application of fluid pressure to opposite sides of said piston, in combination, electric motor means for actuating said reversing valve in opposite directions, and electric switching means in circuit with said motor means for alternately operating said motor means to actuate said valve in said opposite directions, said switching means being located entirely within and mounted at least in part upon said casing and being so constructed and arranged as to be actuated by the back and forth relative movements of said casing and piston.

2. In a windshield cleaner motor having a casing and a piston relatively movable back and forth under differential fluid pressure and a reversing valve for controlling the application of fluid pressure to opposite sides of said piston, in combination, electric motor means for actuating said reversing valve in opposite directions, and two electric switching means in circuit with said motor means for alternately operating said motor means to actuate said valve in said opposite directions, said two switching means being both located entirely within and mounted at least in part upon said casing and being so constructed and arranged as to be successively closed and opened as said casing and piston approach and recede from an opposite end of their relative back and forth movements.

3. In a windshield cleaner motor having a casing and a piston relatively movable back and forth under differential fluid pressure and a reversing valve for controlling the application of fluid pressure to opposite sides of said piston, in combination, means for actuating said reversing valve in opposite directions including a pair of opposed electromagnets, and two electric switching means in circuit one with each of said electromagnets to actuate said reversing valve in said opposite directions, said two switching means being both located entirely within and mounted at least in part upon said casing and being so constructed and arranged as to be alternately actuated by the back and forth relative movements of said casing and piston.

4. In a windshield cleaner motor having a casing element and a piston element relatively movable under differential fluid pressure, means including a shaft oscillated by the movable one of said elements for operatively connecting the motor to a wiper member, and fluid conveying means including a valve movable back and forth between two operative positions for operatively admitting fluid pressure to the motor to effect said relative movement of said elements, in combination, actuating means for the valve including electric motor means operatively connected with said valve, electric circuits for said motor means including two pairs of switch elements, the elements of each switch being connected with the casing and with the piston elements respectively to be actuated thereby for alternately closing said circuits and periodically actuating said motor means.

5. In a windshield cleaner motor adapted to be driven by fluid pressure, having a casing including a piston chamber, a piston movable back and forth in said chamber, and a valve for controlling the application of fluid pressure to opposite sides of said piston, in combination, actuating means for said valve including electric motor means, and electric circuits for said electric motor means including two pairs of switch elements, one switch element of each pair being mounted on said piston and the other switch element of each pair being mounted on said casing adjacent opposite ends of said piston chamber, and said pairs of switch elements being alternately closed for periodically actuating said motor means as said piston moves back and forth.

6. In a windshield cleaner motor adapted to be driven by fluid pressure, having a casing including a piston chamber, a piston movable back and forth in said chamber, and a valve for controlling the application of fluid pressure to opposite sides of said piston, in combination, actuating means for said valve comprising a pair of electro-magnets, and a pair of electric circuits for said magnets each including a pair of switch elements, one switch element of each pair being mounted on said piston and the other switch element of each pair being mounted on said casing element adjacent opposite ends of said piston chamber, at least one of the switch elements of each pair being resilient, and said pairs of switch elements being alternately closed for periodically actuating said electro-magnets as said piston moves back and forth.

7. In a windshield cleaner motor adapted to be driven by air pressure and having an arcuate piston chamber, a swinging piston movable in said chamber and a valve for controlling the application of pressure to opposite sides of said piston, in combination, valve actuating means comprising a pair of electro-magnets, an armature common to both of said magnets, means for operatively connecting said armature to said valve, a source of electric energy, an electric circuit connecting said source of energy to said electro-magnets and switching means inserted in said circuit and located in said piston chamber and operated by the movement of said piston to alternately energize said electro-magnets whereby said valve is actuated to apply air pressure first to one side of said piston and then to the other to cause said piston to swing back and forth.

8. In a windshield cleaner motor adapted to be driven by air pressure and having an arcuate piston chamber, a swinging piston movable in said chamber and a valve for controlling the application of pressure to opposite sides of said piston, in combination, valve actuating means comprising a pair of electro-magnets, an armature common to both of said magnets, means for operatively connecting said armature to said valve, a source of electric energy, an electric circuit connecting said source of energy to said electro-magnets and switching means including resilient contact members, one located on either side of said piston and arranged to make and break said electric circuit to said electro-magnets as said piston moves back and forth to alternately energize said magnets to reverse said valve before said piston reaches the limit of its travel.

9. A device as described in claim 8, wherein stops are provided to limit the piston travel in either direction, said stops being located beyond the normal point of reversal of said piston.

THEODORE J. SCOFIELD.